3,123,404
SEAT
William G. Dunn, 309 W. Garfield St., Clarinda, Iowa
Filed Apr. 13, 1961, Ser. No. 102,721
1 Claim. (Cl. 297—461)

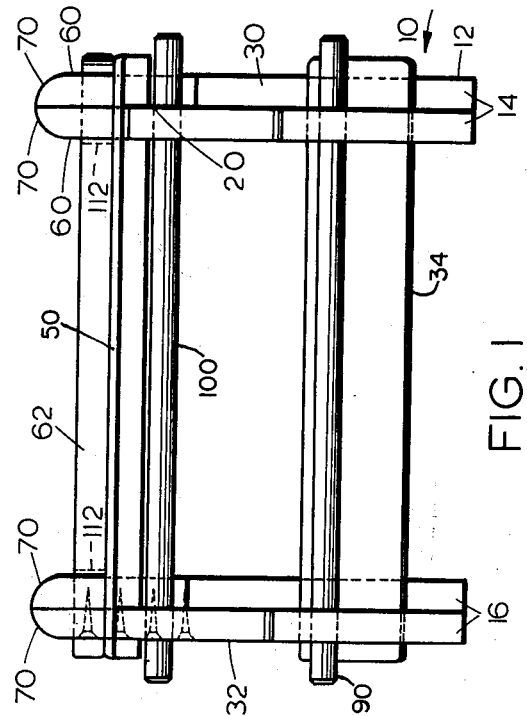

This invention relates to furniture and more particularly it is an object of this invention to provide a piece of furniture which can also be used as the saddle for a camel.

Heretofore camel saddles have for centuries been made in a form such that what are herein called the legs of the saddle were attached in a manner which was relatively unsubstantial. Crude methods were probably efficient for peoples who were prepared constantly to repair anything which would break. However, the use of such camel saddles as pieces of furniture in the livingroom of a modern home has been found to be impractical because they soon come apart and there is a much lesser tendency for the busy peoples of a more modern society to repair.

Therefore it is an object of this invention to provide a camel saddle seat of exceptionally rugged construction as achieved partly by a lapping of the upper ends of the legs, partly by camel back-engaging boards which are not used on the ancient saddles, and partly by certain longitudinal rods.

A further object is to provide a saddle having a set of lower longitudinal rods or the equivalent to which ropes or other cinching means can be attached for securing the saddle to a camel.

A further object is to provide a piece of furniture which can actually be used on a camel.

Yet another object is to provide means for firmly attaching seat members to the legs of the saddle including substantially horizontal shoulders for strong support.

Still another object is to provide a seat the forward and rearward leg portions of which are disposed extending above the seating means so as to form saddle horns, and further in which the saddle horns so formed are rounded so as to be comfortable in the grip of an imaginative youngster and also to provide a good appearance, and further to actually provide effective and desirable saddle horns for use on a camel.

A further object is to provide a seat having upwardly protruding saddle horn portions as described for the advantage that they serve as gripping places for conveniently moving the seat about from one part of the house to another.

Other and further objects and advantages of the present invention will be apparent from the following detailed description, drawings and claim, the scope of the invention not being limited to the drawings themselves as the drawings are only for the purpose of illustrating a way in which the principles of the invention can be applied.

Other embodiments of the invention utilizing the same or equivalent principles may be used and structural changes may be made as desired by those skilled in the art without departing from the present invention and the purview of the appended claim.

In the drawings:

FIGURE 1 is a side elevation of the camel saddle seat.

FIGURE 2 is an end elevation of the seat.

FIGURE 3 is a detail showing one of the four similar legs of the seat.

FIGURE 4 is a view of an end of one of the seat members of the invention at times when the seat member is disposed with its outer edge downwardly.

FIGURE 5 is a top plan view of a seat member of the invention.

Referring to the drawings, the camel saddle seat of this invention is generally shown at 10 in FIGURE 1 and has four legs 12 arranged in a front pair 14 and a rearward pair 16.

It will be seen that each leg of a pair is lapped at its upper end with the other leg of the same pair with one leg of a pair disposed in front of the other and with the upper ends secured together by forward to rearwardly extending securing means of any suitable nature such as the screws 18 shown in FIGURE 2. While screws are shown by way of illustration, it will be understood that any other suitable means can be employed here.

It will be seen that the screws 18 form securing means or means rigidly fastening the legs of each pair together at a plurality of spaced points disposed within the area of the overlapped portions of a pair of legs so as to gain effective securing while permitting a later described open space to exist for receiving a camel's back.

The upper ends of both legs of a pair have a great surface positioned with the surface of one leg in abutment with a similar surface of the other leg of a pair and these surfaces can be seen at 20, their size making possible great strength inasmuch as these surfaces are preferably glued together.

The lower end of each leg 12 of a pair will be seen to be spread apart a greater distance in the mid-portions thereof so that the lower ends diverge in a fashion, such as an inverted V for providing the saddle with an opening 24, best seen in FIGURE 2, which extends on the underside of the saddle from the front 30 to the rear 32 of the saddle in order to receive the camel's back in the opening 24.

It will be seen that the back-engaging members of panels 34 are substantially flat members although they can be curved somewhat as shown; they are horizontally elongated and are secured to lower portions of the legs as described; the back-engaging panels 34 have undersurfaces lying approximately in planes forming acute angles with the vertical and the panels 34 are more closely spaced together at their upper ends than at their lower ends so as to be inclined inwardly toward each other at their upper ends so as to appear to be for engaging the back of a camel.

Camel back-engaging members or panels 34 are provided on the underside of each leg, or to be more exact, on the inner side of each leg at the sides of the opening 24. The back-engaging members 34 are suitably attached as by screws 38, or otherwise, to the respective legs 12 and the back-engaging boards or members 34 extend from the respective forward leg to the respective rearward leg on the right or left side of the saddle respectively.

Each leg 12 has a substantially horizontal shoulder 40 formed in its upper outer corner by the provision of a notch 44 in the leg at that place. It is preferred that the shoulder 40 be actually concave very slightly for providing curvature to seat members or boards 50 which are disposed resting on the shoulders 40.

The back engaging panels 34 extend inwardly from the legs at least as far as any adjacent portion of the legs 12 so as to protect the back of a camel from the relatively narrow and uncomfortable inner edges of the legs 12.

The seat members 50 are secured by screws 54, or other suitable means, to the shoulders 40 and are also preferably glued thereto, and it will be seen that each seat member 50 is concave on its upper side. Each seat member 50, as best seen in FIGURE 5, has a notch on its inner side shown at 56 at the forward and at the rearward end thereof so as to receive the upwardly projecting portions 60 of the legs 12.

It will be seen that each of the legs 12 has an upwardly projecting horn portion 60 and that the two portions 60 of a pair are lapped with each other, one in front of the other, and that the portions 60 of a pair project a substantial distance above the seat members 50 and even above a seat cushion 62 so as to form saddle horns at the forward and rearward ends of the seat.

The upper end of each leg of a pair is rounded on the forward side of the forward leg and the rearward side of the rearward leg of each pair so that the portions of the leg in the horn areas 60 form, in a sense, a rounded post so as to provide an effective saddle horn which can be accidentally engaged without injury and which will have a delightful feel when manipulated by a child in imagining travel on a camel across the desert.

For this same reason, the upper end of each pair of upwardly extending portions 60 are similarly rounded as seen at 70 in order to give this effect.

The camel saddle is further provided with longitudinally extending rods 90 which are spaced downwardly from the seat boards 50 such a distance as to provide the seat with strength. The rods 90 are spaced inwardly from the inner edges of the respective legs 12 in order that ropes can be placed around the rods 90 for attaching the saddle to a camel.

Each rod 90 extends from the forward leg of one pair to the respective rearward leg in the other pair of legs whereby there is a right side rod 90 and a left side rod 90 at the lower part of the seat.

Other rods 100 are preferably provided at places disposed between the rods 90 and the seat 50, preferably disposed much closer to the seat members 50 than to the rods 90. The rods 100 also extend longitudinally and are disposed at the right and the left hand sides of the saddle respectively and attach the forward legs to the rearward legs.

It will be seen that the rods 90 and 100 are suitably secured such as by glue or otherwise to the respective leg to provide a strong and durable piece of furniture.

The cushion 62 can be substantially rectangular, although its corners are rounded, as seen at 110, and the cushion is further provided with suitable notches 112 disposed one each in the forward and rearward edges of the seat 62 and at the center thereof, the notches 112 being for the purpose of receiving the respective saddle horns or upper extremities 60 of the legs in the notches 112 so as to give the seat an excellent finished appearance.

It will be seen that the rods 90 and 100 are preferably received in longitudinally extending openings 130 disposed through the legs and that a very strong construction is thus provided.

The above described camel saddle seat is believed to fulfill the objects above set forth and to provide a strong durable camel saddle as well as an effective piece of house furniture.

From the foregoing description, it is thought to be obvious that a seat constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

A seat of a total size for use as a camel saddle, said seat comprising in combination longitudinally spaced forward and rearward pairs of legs positioned in transversely disposed planes and said planes being in parallel relation whereby the legs of a pair are overlapped at their upper ends, the upper portions of said legs being provided with generally horizontally positioned shoulders, overlapping horn portions projecting upwardly from inner ends of said shoulders, means rigidly fastening the legs of each pair together at a plurality of spaced points in the area of said overlapped upper portions of said legs to prevent them from twisting with respect to each other, the lower ends of the legs of each pair being spaced apart from each other and forming an inverted V, longitudinally positioned generally horizontally disposed seat supporting panel means rigidly secured to upper surfaces of the shoulders of the legs and connecting said pairs of legs, said seat supporting panel means having two open areas therein receiving therethrough said horn portions, horizontally elongated back engaging panels extended between and secured to lower portions of said legs and having undersurfaces lying approximately in planes forming acute angles with the vertical and said panels being more closely spaced together at their upper ends than at their lower ends so as to be inclined inwardly toward each other at their upper ends, and said seat having an open space between said back engaging panels and between lower portions of said legs so as to be adapted to receive therein the back of a camel, and longitudinal members positioned below said seat supporting panels and extended between said forward and rearward legs on each side of said open space, and means connecting said longitudinal members to said legs for retaining said forward and rearward legs in constant spaced relation, said back engaging panels extending inwardly from said legs at least as far as any other portion of said legs.

References Cited in the file of this patent

UNITED STATES PATENTS

| | | |
|---|---|---|
| 172,674 | Tyler | Jan. 25, 1876 |
| 1,207,158 | Gaffers | Dec. 5, 1916 |
| 1,239,756 | Bader et al. | Sept. 11, 1917 |
| 2,341,754 | Anderson | Feb. 15, 1944 |

FOREIGN PATENTS

| | | |
|---|---|---|
| 52,721 | Austria | Mar. 26, 1912 |
| 1,054,295 | France | Oct. 7, 1953 |